US012646798B2

(12) United States Patent
Ok et al.

(10) Patent No.: US 12,646,798 B2
(45) Date of Patent: Jun. 2, 2026

(54) BATTERY MODULE WITH IMPROVED FIRE PROTECTION PERFORMANCE

(71) Applicant: LG ENERGY SOLUTION, LTD., Seoul (KR)

(72) Inventors: Seung-Min Ok, Daejeon (KR);
Yu-Dam Kong, Daejeon (KR);
Seung-Hyun Kim, Daejeon (KR);
Jin-Kyu Shin, Daejeon (KR);
Young-Hoo Oh, Daejeon (KR);
Sang-Hyun Jo, Daejeon (KR);
Sung-Goen Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 647 days.

(21) Appl. No.: 17/926,779

(22) PCT Filed: Jan. 25, 2022

(86) PCT No.: PCT/KR2022/001329
§ 371 (c)(1),
(2) Date: Nov. 21, 2022

(87) PCT Pub. No.: WO2022/164180
PCT Pub. Date: Aug. 4, 2022

(65) Prior Publication Data
US 2023/0201640 A1 Jun. 29, 2023

(30) Foreign Application Priority Data
Jan. 28, 2021 (KR) ........................ 10-2021-0012619

(51) Int. Cl.
H01M 50/211 (2021.01)
A62C 2/06 (2006.01)
(Continued)

(52) U.S. Cl.
CPC ........... H01M 50/383 (2021.01); A62C 2/065 (2013.01); A62C 3/16 (2013.01); H01M 50/211 (2021.01); H01M 50/505 (2021.01)

(58) Field of Classification Search
CPC ....... H01M 50/204–211; H01M 50/30; H01M 50/383; H01M 50/50–507;
(Continued)

(56) References Cited

U.S. PATENT DOCUMENTS

2015/0056482 A1 2/2015 Kyla-Kaila et al.
2018/0194235 A1* 7/2018 Kim ........................ B60L 50/50
(Continued)

FOREIGN PATENT DOCUMENTS

CN 110140235 A 8/2019
JP 2011-181409 A 9/2011
(Continued)

OTHER PUBLICATIONS

Machine translation of Suzuki, JP-2019106307-A. Originally available Jun. 27, 2019. (Year: 2019).*
(Continued)

*Primary Examiner* — Nicole M. Buie-Hatcher
*Assistant Examiner* — Jacob Buchanan
(74) *Attorney, Agent, or Firm* — Birch, Stewart, Kolasch & Birch, LLP

(57) ABSTRACT

A battery module effectively suppresses a fire even when high-temperature gas or sparks are generated therein due to thermal propagation. The battery module includes a cell assembly configured such that secondary batteries having electrode leads are stacked in at least one direction; a module case configured to accommodate the cell assembly in an inner space thereof; a bus bar assembly located on at least one side of the module case and including a module bus bar made of an electrically conductive material and electrically (Continued)

connected to the electrode leads of the cell assembly and a bus bar housing configured so that the module bus bar is placed thereon and having a slot through which the electrode lead passes; and a blocking member located at the slot of the bus bar housing to close at least a portion of the slot by transforming a shape thereof when heat is applied thereto.

10 Claims, 9 Drawing Sheets

(51) Int. Cl.
    *A62C 3/16*       (2006.01)
    *H01M 50/383*     (2021.01)
    *H01M 50/505*     (2021.01)

(58) Field of Classification Search
    CPC ...... H01M 50/572–574; H01M 50/581; A62C
                       2/065; A62C 3/16
    See application file for complete search history.

(56) References Cited

U.S. PATENT DOCUMENTS

| | | |
|---|---|---|
| 2021/0050573 A1 | 2/2021 | Lee |
| 2021/0288387 A1 | 9/2021 | Cho et al. |
| 2021/0320374 A1 | 10/2021 | Lee et al. |
| 2021/0320385 A1* | 10/2021 | Kim .................... H01M 50/284 |
| 2022/0294052 A1* | 9/2022 | Kwon ..................... A62C 2/06 |

FOREIGN PATENT DOCUMENTS

| | | | | |
|---|---|---|---|---|
| JP | 2013-251127 A | | 12/2013 | |
| JP | 2013246920 A | * | 12/2013 | |
| JP | 2019106307 A | * | 6/2019 | ............. Y02E 60/10 |
| JP | 2019114389 A | * | 7/2019 | ............. Y02E 60/10 |
| KR | 10-2015-0003779 A | | 1/2015 | |
| KR | 10-2018-0116958 A | | 10/2018 | |
| KR | 10-2034208 B1 | | 10/2019 | |
| KR | 10-2020-0040614 A | | 4/2020 | |
| KR | 10-2020-0077692 A | | 7/2020 | |
| KR | 10-2020-00952550 A | | 8/2020 | |
| KR | 10-2020-0107213 A | | 9/2020 | |
| KR | 10-2020-0107214 A | | 9/2020 | |
| KR | 10-2021-0006570 A | | 1/2021 | |
| KR | 20210006570 A | * | 1/2021 | .......... H01M 50/502 |

OTHER PUBLICATIONS

Machine translation of Uchiumi, JP 2013-246920. Originally available Dec. 9, 2013. (Year: 2013).*
International Search Report for PCT/KR2022/001329 (PCT/ISA/210) mailed on May 18, 2022.
Extended European Search Report for European Patent Application No. 22 74 6207, dated Sep. 18, 2024.

* cited by examiner

FIG. 5

BATTERY MODULE WITH IMPROVED FIRE PROTECTION PERFORMANCE

TECHNICAL FIELD

The present application claims priority to Korean Patent Application No. 10-2021-0012619 filed on Jan. 28, 2021 in the Republic of Korea, the disclosures of which are incorporated herein by reference.

The present disclosure relates to a battery, and more particularly, to a battery module capable of effectively preventing the occurrence or spread of fire, and a battery pack and an energy storage system including the same.

BACKGROUND ART

In recent years, as the demand for portable electronic products such as laptops, video cameras and mobile phones has rapidly increased and robots, electric vehicles and the like are being commercialized in earnest, research on high-performance secondary batteries allowing repeatedly charging and discharging has been actively researched.

Currently commercialized secondary batteries include nickel cadmium battery, nickel hydrogen battery, nickel zinc battery, lithium secondary battery, and so on. In particular, the lithium secondary battery has almost no memory effect to ensure free charge and discharge, compared to the nickel-based secondary battery, and the lithium secondary battery is spotlighted due to a very low discharge rate and a high energy density.

The secondary battery may be used alone, but in general, a plurality of secondary batteries are electrically connected to each other in series and/or in parallel in many cases. In particular, the plurality of secondary batteries may be electrically connected to each other and accommodated in one module case, thereby configuring one battery module. In addition, the battery module may be used alone, or two or more battery modules may be electrically connected to each other in series and/or in parallel to configure a higher-level device such as a battery pack.

Recently, as issues such as power shortage or eco-friendly energy have been highlighted, an energy storage system (ESS) for storing the generated power is receiving more attention. Representatively, if such an energy storage system is used, it is easy to construct a system such as a smart grid system, so that it is possible to easily control power supply and demand in a specific area or city.

The battery pack used in an energy storage system may require a very large capacity, compared to a small-sized or medium-sized battery pack. Accordingly, the battery pack may typically include a large number of battery modules. In addition, in order to increase the energy density, the plurality of battery modules are often configured to be densely packed in a very narrow space.

However, if the plurality of battery modules are concentrated in a narrow space as described above, they may be vulnerable to fire. For example, a thermal propagation situation may occur in one battery module, so that high-temperature gas is discharged from at least one battery cell. Moreover, high-temperature sparks may be ejected when the gas is discharged, and the sparks may include active materials or molten aluminum particles that are separated from the electrodes inside the battery cell. If these high-temperature sparks and high-temperature gas meet oxygen, it may generate a fire in the battery pack.

In particular, when a fire occurs in a specific battery cell or module, it may spread to other neighboring battery cells, battery modules, or battery packs. In particular, since many batteries are concentrated in a narrow space of the energy storage system, if a fire occurs, it is not easy to suppress the fire. Moreover, considering the size and role of the energy storage system, there is a risk that the fire occurring inside the battery pack may cause very serious damage to property and human life. Therefore, even if a thermal propagation situation occurs in a specific battery cell or module, it is important to prevent this situation from progressing to a fire.

DISCLOSURE

Technical Problem

The present disclosure is designed to solve the problems of the related art, and therefore the present disclosure is directed to providing a battery module configured to effectively suppress a fire even when high-temperature gas or sparks are generated therein due to thermal propagation, and a battery pack and an energy storage system including the same.

However, the technical problems to be solved by the present disclosure are not limited to the above, and other problems not mentioned herein will be clearly understood by those skilled in the art from the following disclosure.

Technical Solution

In one aspect of the present disclosure, there is provided a battery module, comprising: a cell assembly configured such that secondary batteries having electrode leads are stacked in a first direction; a module case configured to accommodate the cell assembly in an inner space thereof; a bus bar assembly located on at least one side of the module case and including a module bus bar made of an electrically conductive material and electrically connected to the electrode leads of the cell assembly and a bus bar housing configured so that the module bus bar is placed thereon and having a slot through which an electrode lead of the electrode leads passes; and at least one blocking member located at the slot of the bus bar housing and configured to close at least a portion of the slot by transforming a shape thereof when heat is applied thereto.

Here, the at least one blocking member may be configured to expand in volume to close an empty space of the slot when heat is applied thereto.

In addition, the at least one blocking member may be located at an inner side of the bus bar housing.

In addition, the at least one blocking member may be located on opposites sides of the electrode lead.

In addition, the at least one blocking member may be a sheet.

In addition, the bus bar housing may be configured to have an inclined portion formed at the slot, and the at least one blocking member may be located on the inclined portion.

In addition, the at least one blocking member may be a plurality of blocking members so that the plurality of blocking members are arranged from an inner side to an outer side of the bus bar housing.

In addition, at least two blocking members of the plurality of blocking members may be arranged from the inner side to the outer side of the bus bar housing and have different thermal expansion coefficients.

In addition, the at least one blocking member may be configured to press the electrode lead when the shape of the at least one blocking member is transformed.

In another aspect of the present disclosure, there is also provided a battery pack, comprising the battery module according to the present disclosure.

In another aspect of the present disclosure, there is also provided an energy storage system, comprising the battery module according to the present disclosure.

Advantageous Effects

According to the present disclosure, it is possible to effectively prevent a fire from occurring in a battery module.

In particular, according to an embodiment of the present disclosure, even if a high-temperature gas or spark is generated due to a thermal propagation phenomenon in a specific battery cell included in the battery module, it is possible to prevent it from progressing to a fire.

Moreover, according to an embodiment of the present disclosure, it is possible to block the inflow of oxygen into the battery module while easily discharging the gas out of the battery module. Therefore, by excluding oxygen, which is one of the three elements of combustion, it is possible to fundamentally block the occurrence of combustion, namely a fire, inside the battery module.

In addition, according to an embodiment of the present disclosure, even if a fire occurs inside the battery module, the inflow of additional oxygen is blocked so that the fire can be rapidly extinguished without spreading.

In addition, the present disclosure may have various other effects, and such effects will be described in each embodiment, or any effect that can be easily inferred by those skilled in the art will not be described in detail.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 5 is a perspective view showing the configuration of FIG. 4, viewed from the inside of the battery module.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
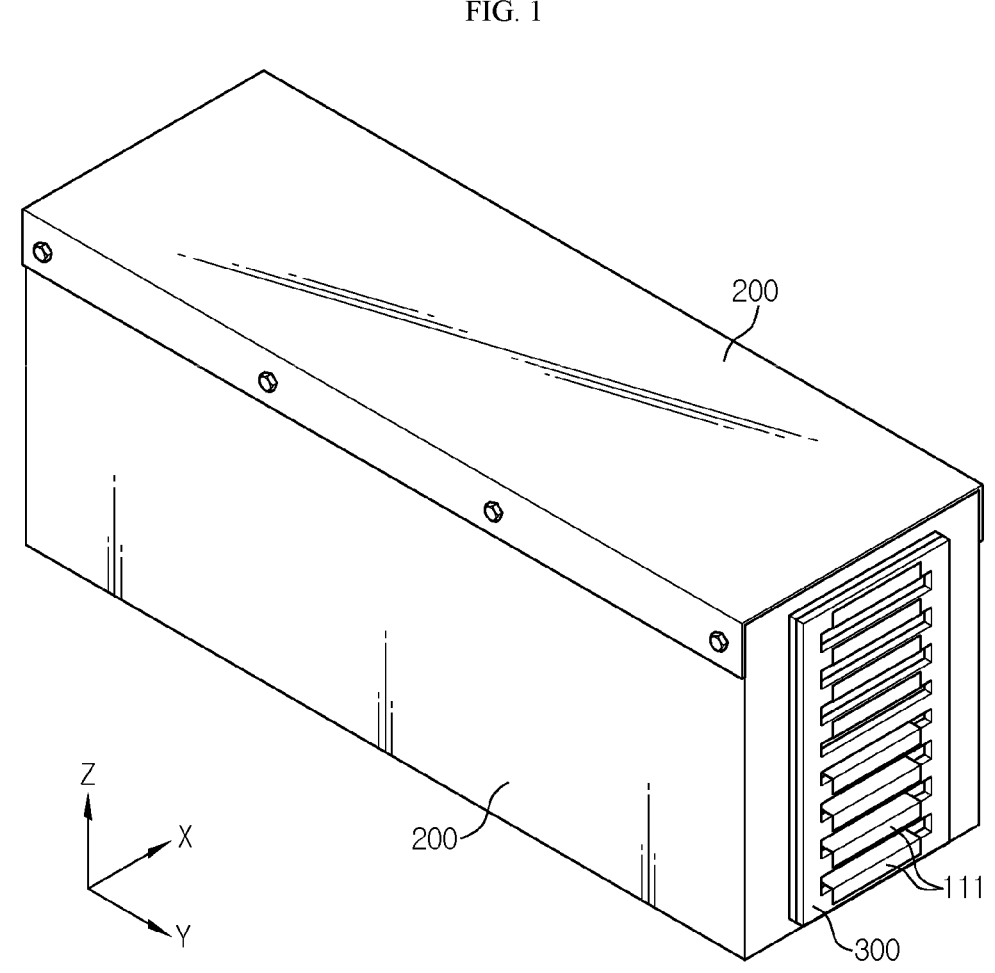
FIG. 1 is a perspective view schematically showing a configuration of a battery module according to an embodiment of the present disclosure.
Figure 2:
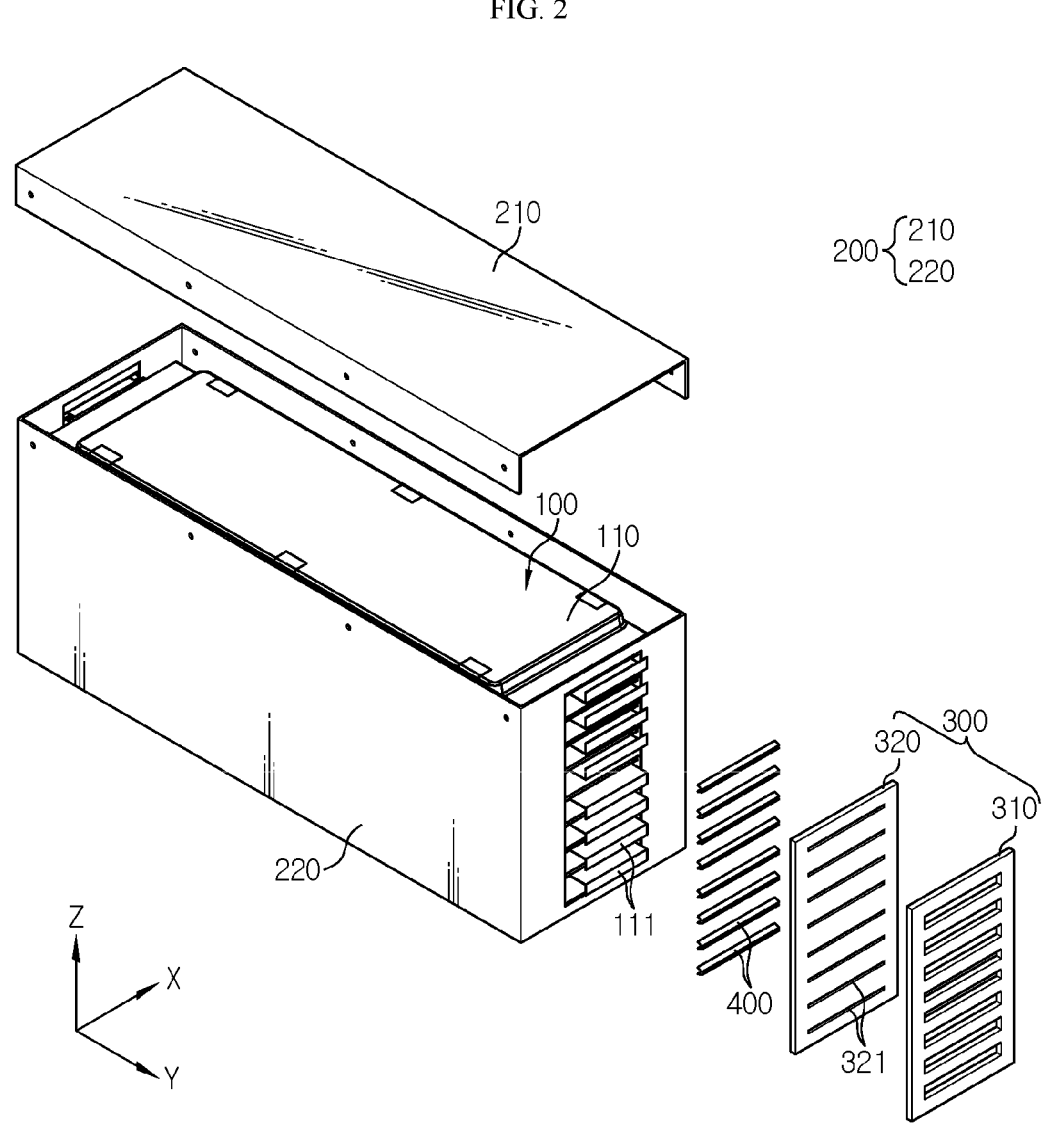
FIG. 2 is an exploded perspective view showing some components of FIG. 1.

FIG. 1 is a perspective view schematically showing a configuration of a battery module according to an embodiment of the present disclosure, and FIG. 2 is an exploded perspective view showing some components of FIG. 1.

Referring to FIGS. 1 and 2, the battery module according to the present disclosure includes a cell assembly 100, a module case 200, a bus bar assembly 300, and a blocking member 400.

The cell assembly 100 may include a plurality of secondary batteries 110 (battery cells). The secondary battery 110 may include an electrode assembly, an electrolyte and a battery case. In particular, as shown in FIGS. 1 and 2, the secondary battery 110 may be a pouch-type secondary battery. However, other types of secondary batteries 110, such as a cylindrical battery or a prismatic battery, may also be adopted as the cell assembly 100.

The plurality of secondary batteries 110 may be stacked in at least one direction to form the cell assembly 100. For example, as shown in the drawings, the plurality of secondary batteries 110 may be pouch-type batteries that are stacked up and down in a laid-down form. Each pouch-type secondary battery 110 may include electrode leads 111, which may be located at both ends or at one end of each secondary battery 110. A secondary battery 110 in which the electrode leads 111 protrude in both directions is called a bidirectional cell, and a secondary battery in which the electrode leads 111 protrude in one direction is called a unidirectional cell. For example, the secondary battery 110 shown in FIGS. 1 and 2 is a bidirectional cell, and it may be regarded that the electrode leads 111 are positioned at both ends in the Y-axis direction. However, the secondary battery 110 of the battery module according to the present disclosure may also have a form in which the electrode leads 111 are positioned only at one end in the Y-axis direction, for example, the end in the +Y-axis direction. The present disclosure is not limited by any specific type or form of the secondary battery 110, and various types of secondary batteries 110 known at the time of filing of this application may be employed in the cell assembly 100 of the present disclosure. In this specification, a case where the secondary battery 110 is a bidirectional cell will be mainly described.

The module case 200 may have an empty space formed therein and be configured to accommodate the cell assembly 100. For example, the module case 200 may include an upper case 210 and a lower case 220, as shown in the drawings. In this case, the lower case 220 may include a lower plate and a side plate. Additionally, the lower case 220 may further include a front plate and a rear plate. The lower case 220 may be formed by coupling the plates by fastening such as bolting or welding, but may also be manufactured in an integrated form. The upper case 210 and the lower case 220 may be coupled with each other to define an inner space. In addition, the cell assembly 100 may be accommodated in the inner space.

The module case 200 may be configured such that at least one side is opened. In addition, the module case 200 may be configured such that the electrode leads 111 of the cell assembly 100 are positioned in the open portion. For example, referring to FIG. 2, the cell assembly 100 may be configured such that the electrode leads 111 are positioned at both ends in the Y-axis direction and both ends of the module case 200 in the Y-axis direction are opened correspondingly. In addition, the bus bar assembly 300 may be coupled to the open portion. If the electrode leads 111 of the cell assembly 100 are positioned to protrude only in one side of the battery module, for example in the +Y-axis direction, the module case 200 may be configured to be opened only in the +Y-axis direction. The module case 200 may be configured to be closed except for the open portion to which the bus bar assembly 300 is coupled. Accordingly, when gas is generated inside the module case 200, the generated gas may be discharged only to the side where the bus bar assembly 300 is located.

As described above, the bus bar assembly 300 may be configured to be positioned on at least one side of the module case 200, for example at both front and rear ends of the module case 200 (both ends in the Y-axis direction in FIG. 2). In addition, the bus bar assembly 300 may include a module bus bar 310 and a bus bar housing 320.

Here, the module bus bar 310 may be made of an electrically conductive material, for example a metal material such as copper or nickel. In addition, the module bus bar 310 may be configured to be electrically connected to the electrode leads 111 of the cell assembly 100. In particular, the module bus bar 310 may be welded or bolted in direct contact with the electrode leads 111. In addition, the module bus bar 310 may electrically connect the electrode leads 111 to each other or transmit voltage information sensed from the electrode leads 111 to an external control unit, for example a BMS (Battery Management System).

In addition, the bus bar housing 320 may be configured so that the module bus bar 310 may be placed thereon. For example, the bus bar housing 320 may have a portion with a shape corresponding to the surface of the module bus bar 310, for example a planar shape, as a placing portion so that the module bus bar 310 is placed thereon. In addition, the bus bar housing 320 may support the module bus bar 310 so that the placed module bus bar 310 may stably maintain its position. For example, the bus bar housing 320 may allow the module bus bar 310 to be coupled and fixed using various fastening methods such as bolting, riveting, fusion, and insertion. The bus bar housing 320 may be made of an electrically insulating material, such as plastic (polymer), such that it is not electrically connected to the module bus bar 310.

The bus bar housing 320 may have a slot 321 through which the electrode lead 111 passes. In general, for the stable coupling, the module bus bar 310 may be placed on the outer surface of the bus bar housing 320, and the electrode lead 111 may pass through the slot 321 at the inner side of the bus bar housing 320 and then come into contact with the module bus bar 310 located at an outer side. Meanwhile, unless stated otherwise in this specification, the inner side may mean an inner direction of the module case 200 in which the cell assembly 100 exists, and the outer side may mean an outer direction of the module case 200.

The slot 321 may be formed in a shape corresponding to the shape of the electrode lead 111 so that the electrode lead 111 may easily pass therethrough. For example, as shown in the drawings, the slot 321 may be formed to be elongated in the left and right direction (X-axis direction in the drawing). In addition, a plurality of slots 321 may be formed in the bus bar housing 320. Moreover, if the pouch-type secondary batteries 110 are stacked in the vertical direction (the Z-axis direction in the drawing), a plurality of electrode leads 111 may exist in the vertical direction. Accordingly, as shown in FIG. 2, the plurality of slots 321 may also be arranged to be spaced apart from each other by a predetermined distance in the vertical direction.

The slot 321 may serve to penetrate the electrode lead 111 and support the electrode lead 111, and may additionally serve to discharge a vent gas. The slot 321 may have an empty gap around the electrode lead 111 in a state where the electrode lead 111 passes therethrough. In addition, the other part of the module case 200 may be configured in an almost sealed form. In this case, if a vent gas is generated due to a thermal propagation situation or the like in at least one of the secondary batteries 110 included in the cell assembly 100, the gas may increase the pressure inside the battery module. However, since the slot 321 has an empty gap formed around the electrode lead 111, the gas inside the battery module may be discharged to the outside through the slot 321. This will be described in more detail with reference to FIG. 3.

Figure 3:
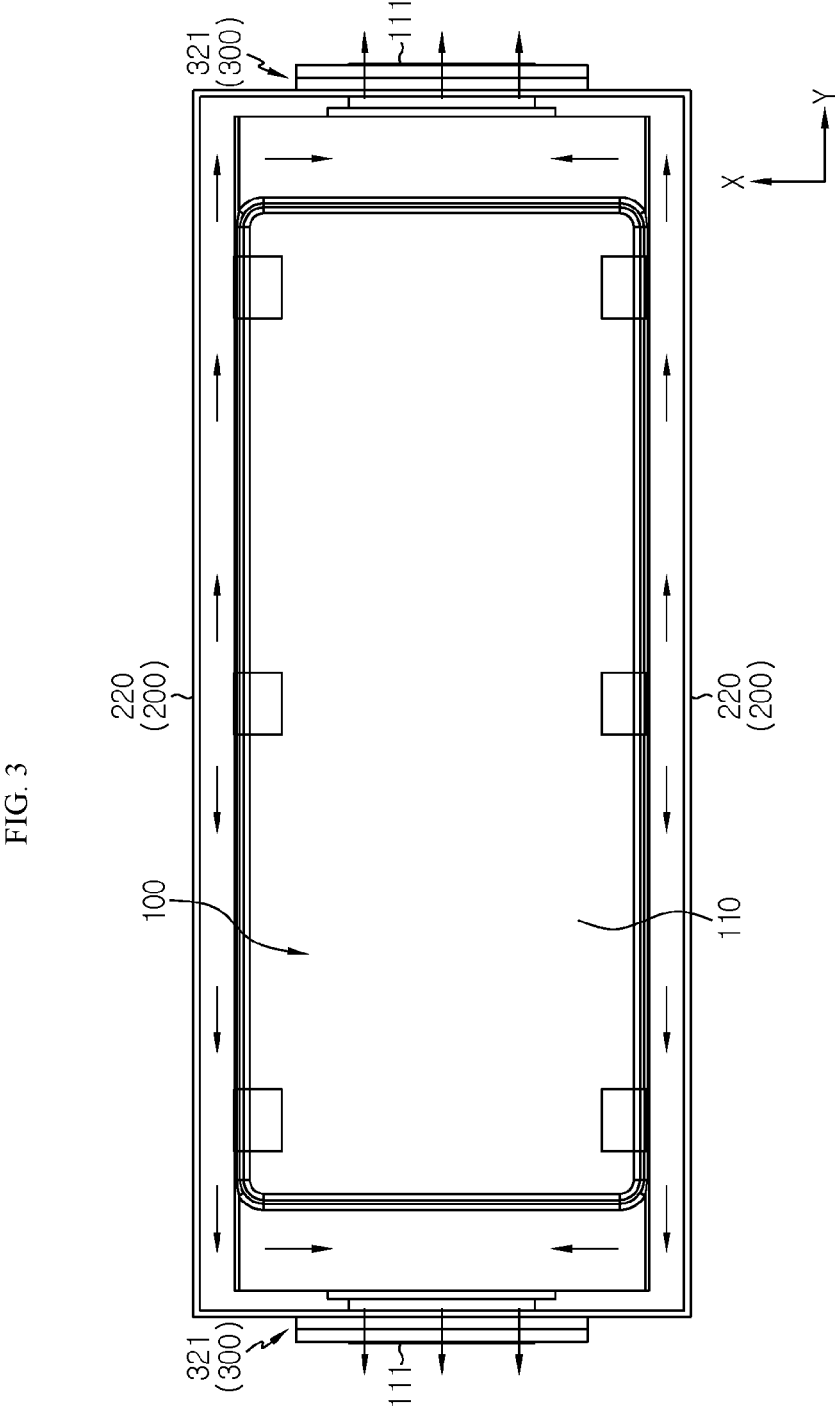
FIG. 3 is a diagram schematically showing a discharge direction of an internal gas in the configuration of the battery module according to an embodiment of the present disclosure.

FIG. 3 is a diagram schematically showing a discharge direction of an internal gas in the configuration of the battery module according to an embodiment of the present disclosure. In particular, FIG. 3 may be regarded as a diagram showing the internal configuration of the battery module of FIG. 2, viewed from the above.

Referring to FIG. 3, when gas is generated from at least one secondary battery 110 located inside the module, the generated gas may be discharged through the slot 321 formed in the bus bar assembly 300. In particular, when gas is generated inside the pouch-type secondary battery 110 to increase the internal pressure, there is a high possibility that a side edge is vented, rather than an edge where the electrode lead 111 is located. In addition, if the side edge is vented in this way, the gas discharged from the vented portion may flow along the surface of the module case 200, for example the side plate of the lower case 220, move toward the bus bar assembly 300, and be discharged to the outside of the module through the slot 321, as indicated by the arrow in the drawing.

The blocking member 400 may be located at the slot 321 of the bus bar housing 320. The configuration of the blocking member 400 will be described in more detail with reference to FIGS. 4 and 5.

Figure 4:
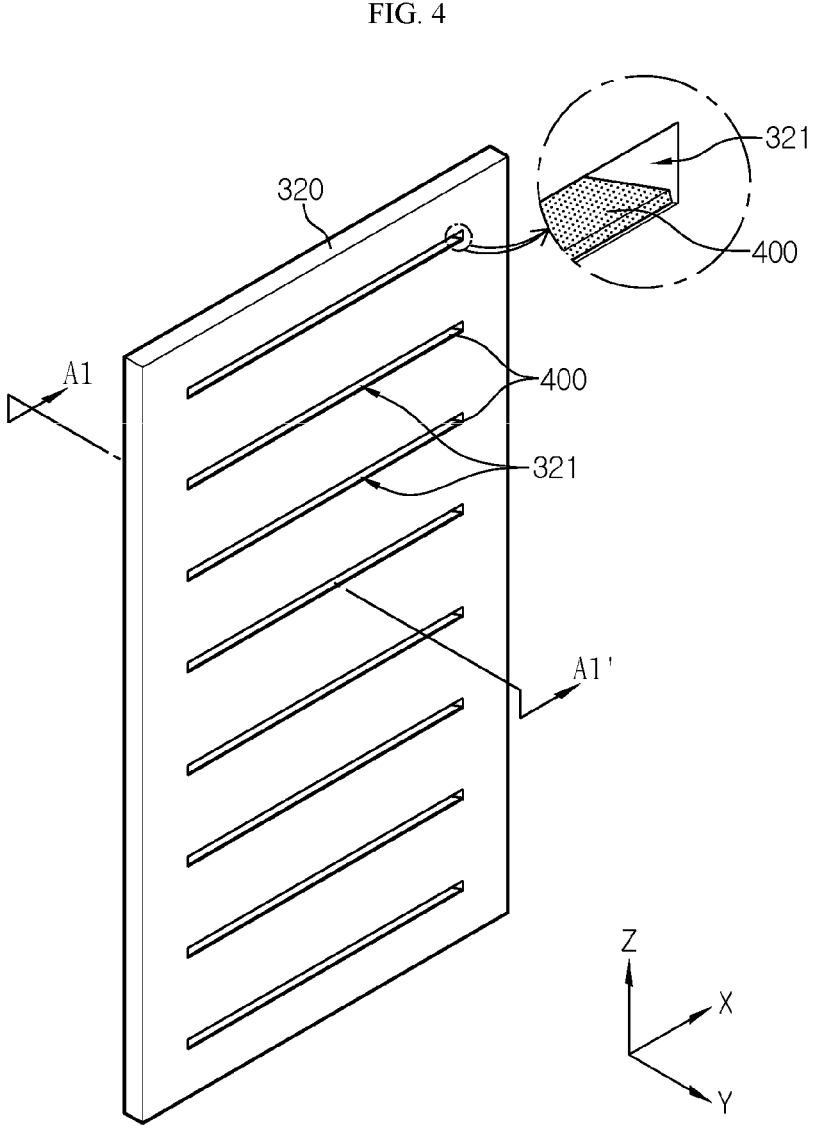
FIG. 4 is a perspective view showing a bus bar housing and a blocking member according to an embodiment of the present disclosure, viewed from the outside of the battery module.
Figure 5:
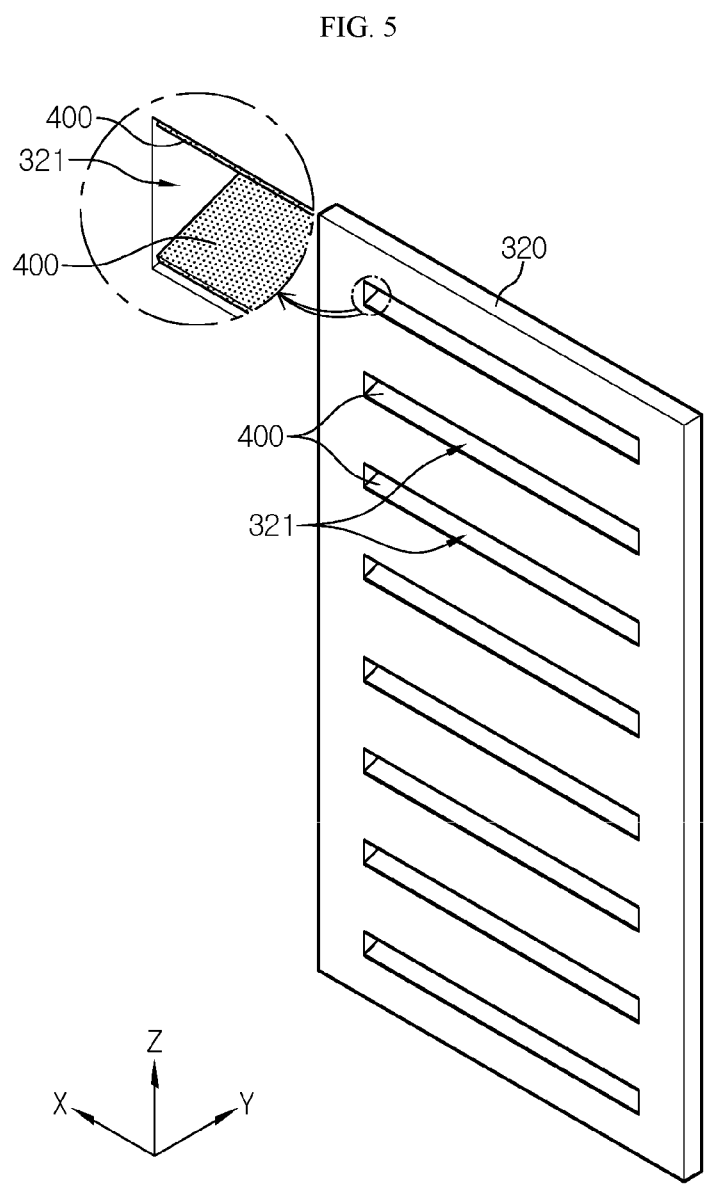

FIG. 4 is a perspective view showing the bus bar housing 320 and the blocking member 400 according to an embodiment of the present disclosure, viewed from the outside of the battery module. FIG. 5 is a perspective view showing the configuration of FIG. 4, viewed from the inside of the battery module.

Referring to FIGS. 4 and 5, the plurality of slots 321 may be formed in the bus bar housing 320 to be arranged in the vertical direction, and the blocking member 400 may be located at each of the plurality of slots 321. For example, if eight slots 321 are formed in the bus bar housing 320 in the vertical direction and one or more electrode leads 111 are inserted into each of the slots 321, the blocking member 400 may be provided to each slot 321.

The blocking member 400 may be configured to transform its shape when heat is applied thereto. Also, the blocking member 400 may be configured to block at least a portion of the slot 321 due to the shape transformation. This will be described in more detail with reference to FIGS. 6 and 7.

Figure 6:
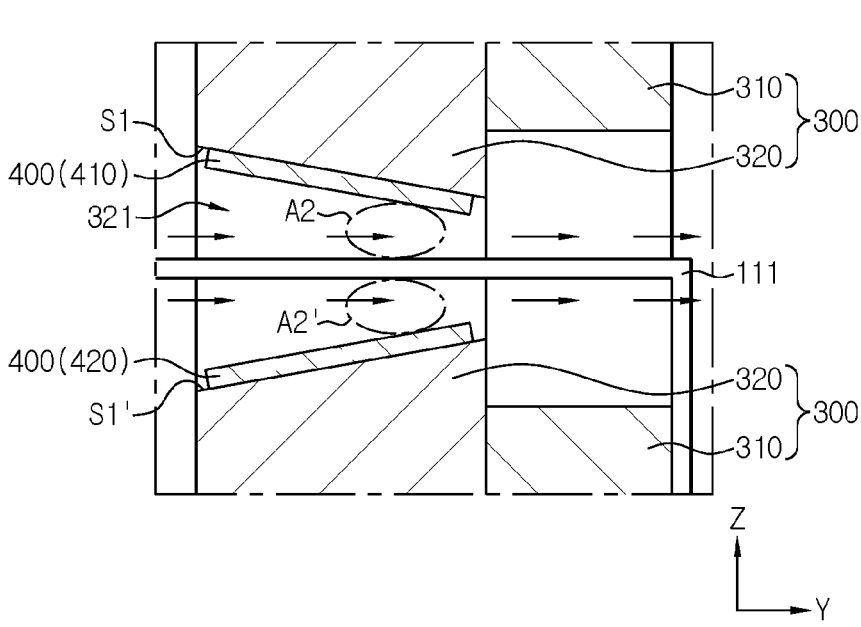
FIGS. 6 and 7 are cross-sectional views schematically showing a shape-transformed configuration of the blocking member according to an embodiment of the present disclosure.
Figure 7:
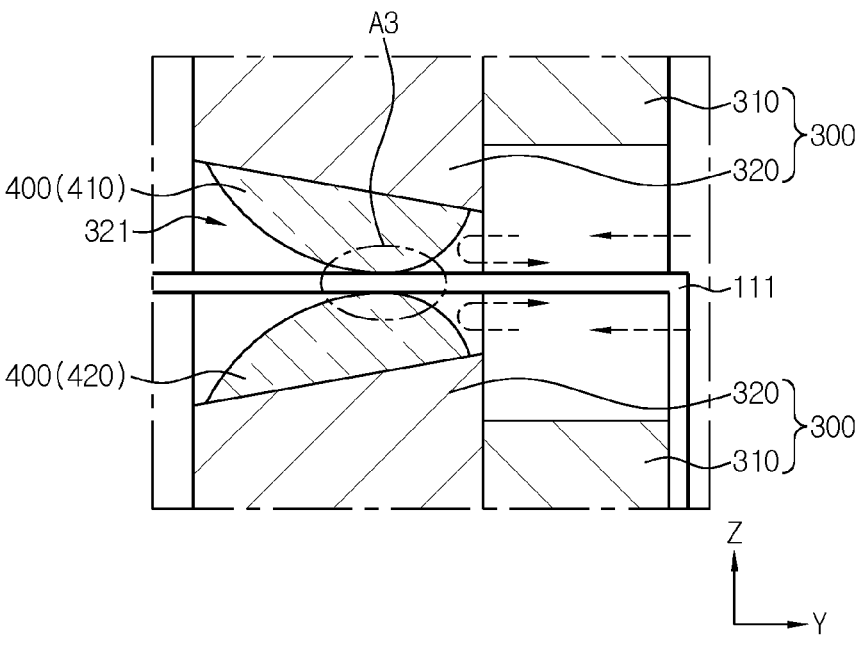

FIGS. 6 and 7 are cross-sectional views schematically showing a shape-transformed configuration of the blocking member 400 according to an embodiment of the present disclosure. For example, FIGS. 6 and 7 are cross-sectional views, taken along the line A1-A1' of FIG. 4, and are illustrated based on one slot 321, wherein the module bus bar 310 and the electrode lead 111 are additionally depicted. More specifically, FIG. 6 is a diagram showing the blocking member 400 before shape transformation, and FIG. 7 is a diagram showing the blocking member 400 after shape transformation.

First, referring to FIG. 6, the blocking member 400 may be attached to the inner surface of the slot 321 formed in the bus bar housing 320. In particular, the blocking member 400 may be attached to the upper inner surface and the lower inner surface of the slot 321. In this case, the blocking member 400 may be configured to form an empty space between the electrode lead 111 and blocking member 400, as indicated by A2 and A2', in a normal state in which heat of a certain level or more is not applied. For example, the blocking member 400 may be configured not to contact the electrode lead 111 in a normal state. In addition, due to the empty space in the slot 321, a fluid, particularly a gas, may flow in and out between the inside of the battery module (the left part of FIG. 6) and the outside of the battery module (the right part of FIG. 6). Moreover, when gas is vented due to thermal propagation in a specific cell inside the battery module, the venting gas may be discharged to the outside through the slot 321 as indicated by arrows in FIG. 6.

However, if the heat generated due to the thermal propagation of a specific cell is transferred to the blocking member 400 at a certain level or higher, or if the heat of the venting gas is transferred to the blocking member 400 at a certain level or higher, the shape of the blocking member 400 may be transformed as shown in FIG. 7. In particular, the shape transformation of the blocking member 400 may be configured to block at least a portion of the slot 321. For example, the empty space between the blocking member 400 and the electrode lead 111 indicated by A2 and A2' in FIG. 6 may be blocked by the blocking member 400 as indicated by A3 in FIG. 7.

According to this configuration of the present disclosure, if gas is vented due to a thermal propagation situation or the like occurring inside the battery module, the venting gas may be smoothly discharged to the outside of the battery module through the slot 321. Therefore, it is possible to prevent an explosion caused by an increase in the internal pressure of the battery module. In addition, due to the heat transferred while the venting gas is discharged, the slot 321 may be blocked, so that the inflow of oxygen into the battery module through the slot 321 may be effectively blocked after the venting gas is discharged (see the dotted arrow in FIG. 7). Therefore, according to this configuration, it is possible to prevent a fire from occurring inside the battery module.

Moreover, a heat source such as a spark or a combustible material such as a gas or a component of the secondary battery 110 may exist inside the battery module. However, if the inflow of oxygen is blocked as described above, one of three elements of combustion does not exist inside the battery module, so that combustion may be prevented inside the battery module. In addition, even when a small flame or fire occurs inside the battery module, since the inflow of additional oxygen is blocked, it is possible to prevent the fire from spreading.

In particular, the blocking member 400 may be configured to expand in volume when heat is applied. In addition, the blocking member 400 may be configured to block the empty space of the slot 321 due to the volume expansion.

That is, if heat is applied, the blocking member 400 may gradually expand in volume to fill the empty space inside the slot 321 as shown in FIG. 7. Accordingly, it is possible to prevent external oxygen from flowing into the battery module.

To this end, the blocking member 400 may have various thermal expansion materials known at the time of filing of this application. For example, the blocking member 400 may be configured to be thermally expandable by having various polymer materials such as PDMS (Poly-Di-Methyl-Siloxane), polyvinyl acetate, polystyrene, butyl (meth)acrylate, hexyl (meth)acrylate, n-octyl (meth)acrylate, isooctyl (meth)acrylate, 2-ethylhexyl (meth)acrylate, isononyl (meth)acrylate, and a urethane-based polymer. In addition, the blocking member 400 may further include a heat-resistant material. For example, the blocking member 400 may be configured such that the outer surface is coated with a heat-resistant material such as ceramic, so that the blocking member 400 is not damaged while its volume is expanded by the heat of the venting gas.

Thermal expansion of the blocking member 400 may be suitably set according to a type or a thermal expansion coefficient of the thermal expansion material included in the blocking member 400. In addition, the degree of thermal expansion of the blocking member 400 may be suitably set by a user according to various conditions, such as the size or shape of the blocking member 400 or the slot 321, and the type of the secondary batteries 110.

According to the embodiment of the present disclosure, the blocking member 400 may be configured to be more easily closed. That is, in configuring the blocking member 400 using a thermal expansion material, the configuration of blocking the slot 321 due to the application of heat may be more easily implemented. In addition, according to this embodiment, the venting gas may be discharged more smoothly. That is, when the blocking member 400 is expanded while the venting gas is discharged, the discharge space of the venting gas may be further reduced during the expansion process of the blocking member 400. Therefore, even if the amount of the venting gas present inside the battery module is not large, the discharge flow rate of the venting gas may not be significantly reduced since the size of the discharge hole is reduced. Accordingly, it is possible to allow the venting gas to be more reliably discharged, and it is also possible to more reliably block the inflow of external oxygen through the slot 321 due to the discharge pressure of the venting gas.

The blocking member 400 may be configured to be positioned inside the bus bar housing 320.

For example, referring to FIG. 2, based on the bus bar housing 320 located at the front side of the battery module, the module bus bar 310 may be located on the outer side of the bus bar housing 320 (+Y-axis direction in FIG. 2). In addition, the blocking member 400 may be located at the inner side of the bus bar housing 320 (−Y-axis direction in FIG. 2). That is, the blocking member 400 may be located on a part other than the outer surface of the bus bar housing.

In particular, the blocking member 400 may be located in the inner space of the slot 321 in the bus bar housing 320. That is, the blocking member 400 may be configured to be positioned on a passage through which gas moves when the gas moves from the outside to the inside of the bus bar housing 320.

According to this embodiment of the present disclosure, the inflow of external oxygen may be more easily blocked by the blocking member 400. Moreover, since the module bus bar 310 may be attached to the outer surface of the bus bar housing 320, in this case, the blocking member 400 may be closed by the module bus bar 310 without interference.

In addition, the blocking member 400 may be configured to be positioned at both sides based on the electrode lead 111. In particular, the electrode lead 111 may be formed in the form of a plate having two large surfaces, and the blocking member 400 may be positioned at both sides to face the two large surfaces, respectively.

For example, referring to FIG. 6, in a state where the electrode lead 111 is inserted into the slot 321, the blocking member 400 may be provided on both the upper side and the lower side of the electrode lead 111.

According to this configuration of the present disclosure, the inflow of oxygen may be blocked more reliably by the blocking member 400. In particular, since oxygen may flow in at both sides of the electrode lead 111, if the blocking member 400 is positioned on both sides of the electrode lead 111 as in this embodiment, the sealing force around the electrode lead 111 may be secured to block the inflow of oxygen more effectively.

In addition, the blocking member 400 may be configured to have a greater width than the electrode lead 111. This will be described in more detail with reference to FIG. 8.

Figures 8, 9:
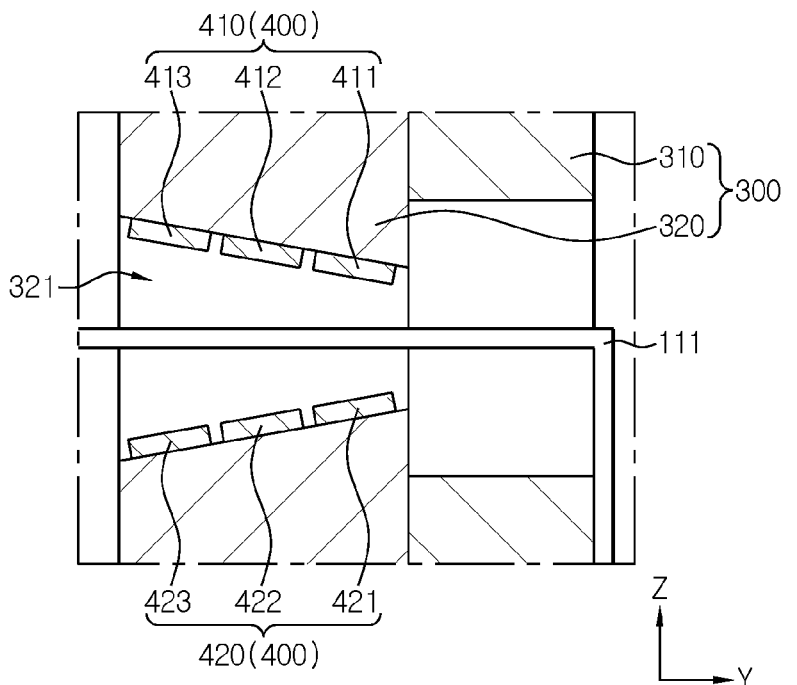
FIG. 8 is a diagram schematically showing a width between the blocking member and the electrode lead in the battery module according to an embodiment of the present disclosure.
FIGS. 9 and 10 are cross-sectional views schematically showing the configuration of a blocking member according to another embodiment of the present disclosure.

FIG. 8 is a diagram schematically showing a width between the blocking member 400 and the electrode lead 111 in the battery module according to an embodiment of the present disclosure. In particular, FIG. 8 may be regarded as a diagram, viewed from the above based on one slot 321.

Referring to FIG. 8, the width of the blocking member 400 is indicated by W1, and the width of the electrode lead 111 is indicated by W2. In this case, W1 may be formed to have a larger size than W2. That is, the blocking member 400 may be formed to have a greater width than the electrode lead 111. In addition, when the blocking member 400 and the electrode lead 111 are viewed from the above, the blocking member 400 may be configured to protrude in both side directions of the electrode lead 111 (X-axis direction of FIG. 8).

According to this configuration of the present disclosure, since all of the periphery of the electrode lead 111, particularly the left and right sides of the electrode lead 111, is surrounded, it is possible to prevent a gap from being created around the electrode lead 111. That is, it is possible that not only the upper or lower portions of the electrode lead 111 but also the left and right sides of the electrode lead 111 are covered by the blocking member 400. In particular, this configuration may be obtained after the blocking member 400 is transformed due to heat. Therefore, in this case, it is possible to effectively block the inflow of oxygen by securing the sealing force around the electrode lead 111.

Moreover, as shown in FIGS. 6 and 7, the blocking member 400 includes an upper blocking member 410 and a lower blocking member 420, and the upper blocking member 410 and the lower blocking member 420 may be positioned at both sides (upper and lower sides) with respect to one electrode lead 111. In this case, the upper blocking member 410 and the lower blocking member 420 may be configured to expand due to heat and contact each other. For example, the upper blocking member 410 and the lower blocking member 420 may be configured such that, due to thermal expansion, their portions protruding in the left and right directions further to the electrode lead 111 contact each other, as indicated by A4 and A4' in FIG. 8.

According to this configuration of the present disclosure, due to the contact of the upper blocking member 410 and the lower blocking member 420, sealing properties of the side surfaces of the electrode lead 111 may be stably secured.

In particular, in this embodiment, the blocking member 400 may be configured such that its width after thermal expansion is equal to the width of the slot 321 of the bus bar housing 320. That is, both the width of the blocking member 400 in the thermally expanded state and the width of the slot 321 may be the same as W1. In this case, the sealing property of the entire slot 321 may be stably secured. Moreover, the width of the blocking member 400 may also be obtained before thermal expansion. That is, the blocking member 400 may be configured to have the same width as the width of the slot 321 even before thermal expansion.

The blocking member 400 may be configured in the form of a sheet, as shown in various drawings. In particular, the blocking member 400 may be configured in the form of a sheet made of a thermally expandable material, namely a thermally expandable sheet. In this case, one surface of the blocking member 400 may be attached to the inner surface of the bus bar housing 320, for example the inner surface of the slot 321, and the other surface of the blocking member 400 may be disposed to face the electrode lead 111.

According to this configuration of the present disclosure, the blocking member 400 may be included inside the slot 321 more easily. That is, since the blocking member 400 is formed in the form of a sheet, the blocking member 400 is formed to have a small thickness, and thus the blocking member 400 may be easily inserted into the inner space of the slot 321. Also, even if the size of the slot 321 is not great, the blocking member 400 may be positioned inside the slot 321. In addition, the blocking member 400 and the bus bar housing 320 may be easily coupled using an adhesive or the like. In addition, according to this configuration, when the electrode lead 111 is inserted into the slot 321, it is possible to minimize the deterioration of process efficiency caused by the blocking member 400.

The bus bar housing 320 may be configured to have an inclined portion formed in the slot 321. In addition, the blocking member 400 may be configured to be positioned on the inclined portion of the slot 321. In particular, the inclined portion may be configured to be positioned at both sides based on the electrode lead 111.

For example, the bus bar housing 320 may be configured such that the inner surface of the slot 321 is inclined, as indicated by S1 and S1' in FIG. 6. In particular, the bus bar housing 320 may be configured so that both the upper surface of the slot 321 as indicated by S1 and the lower surface of the slot 321 as indicated by S1' are inclined. In addition, the blocking member 400 may be configured to be provided on both the inclined portions, namely the upper inclined portion S1 and the lower inclined portion S1'.

According to this configuration of the present disclosure, the process of inserting the electrode lead 111 from the inner side of the slot 321 to the outer side may be performed more smoothly. In addition, according to this configuration, the slot 321 of the bus bar housing 320 may be formed to be gradually narrower as it goes from the inner side to the outer side. Therefore, when gas is vented, the discharge pressure is set high at the outer outlet of the slot 321, so that the inflow of oxygen into the slot 321 may be more reliably blocked.

Figure 10:
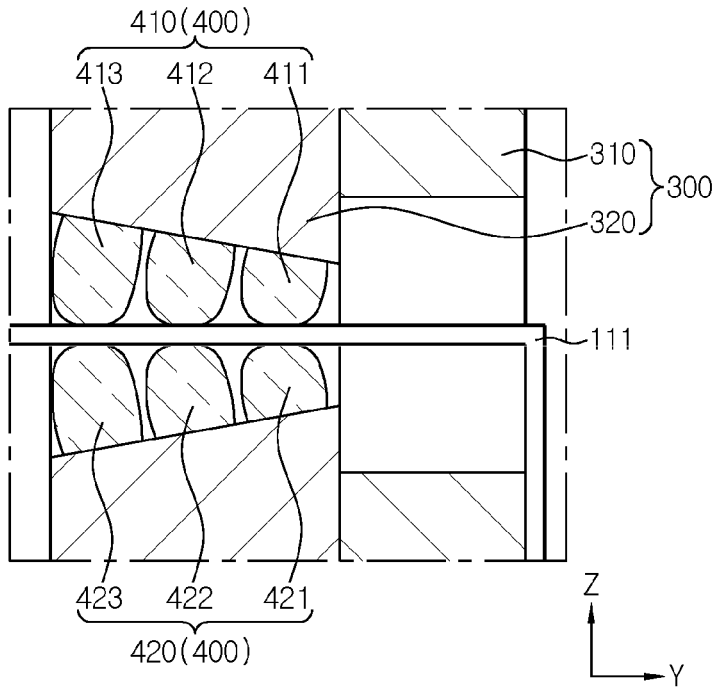

FIGS. 9 and 10 are cross-sectional views schematically showing a blocking member 400 according to another embodiment of the present disclosure. In particular, FIG. 9 shows a configuration before transformation of the blocking member 400, and FIG. 10 shows a configuration after transformation of the blocking member 400. With respect to this embodiment, features different from those of the former embodiments will be described in detail, and features substantially identical or similar to those of the former embodiments will not be described in detail again.

First, referring to FIG. 9, a plurality of blocking members 400 may be arranged from the inside to the outside. That is, the blocking member 400 may include an upper blocking member 410 and a lower blocking member 420, and the upper blocking member 410 and the lower blocking member 420 may include a plurality of unit blocking members, respectively. Moreover, in FIG. 9, the upper blocking member 410 and the lower blocking member 420 may include three unit blocking members, respectively. More specifically, the upper blocking member 410 and the lower blocking member 420 may include an outer blocking member 411, 421, a central blocking member 412, 422, and an inner blocking member 413, 423, respectively.

According to this configuration of the present disclosure, the configuration for improving the oxygen inflow blocking effect by the blocking member 400 may be designed more diversely.

In particular, the blocking member 400 may be set such that at least two blocking members 400 arranged from the inside to the outside have different thermal expansion coefficients.

For example, in the configuration of FIG. 9, the three unit blocking members included in the upper blocking member 410, namely the outer blocking member 411, the central blocking member 412 and the inner blocking member 413, may be made of materials having different thermal expansion coefficients.

Moreover, in this case, the unit blocking members may be configured to have a greater thermal expansion coefficient as being positioned inside. For example, among three unit blocking members included in the upper blocking member 410, the thermal expansion coefficient of the outer blocking member 411 may be lowest, the thermal expansion coefficient of the inner blocking member 413 may be highest, and the thermal expansion of the central blocking member 412 may be middle. In addition, the three unit blocking members included in the lower blocking member 420 may also be designed in this way.

According to this configuration of the present disclosure, with respect to the inner space of the slot 321 in which the inclined portion is formed, the sealing force may be further improved. That is, according to this embodiment, as shown in FIG. 10, if heat is applied to the upper blocking member 410, the degree of expansion may gradually increase from the outer blocking member 411 to the inner blocking member 413. Also, if heat is applied to the lower blocking member 420, the degree of expansion may gradually increase from the outer blocking member 421 to the inner blocking member 423. The inner space of the slot 321 may gradually increase from the outside to the inside. In this configuration, the degree of expansion of the unit blocking member located at the inner side is increased, the blocking member 400 may expand in a shape corresponding to the shape of the inner space of the slot 321. Therefore, in this case, the inner space of the slot 321 may be more reliably blocked.

Figure 11:
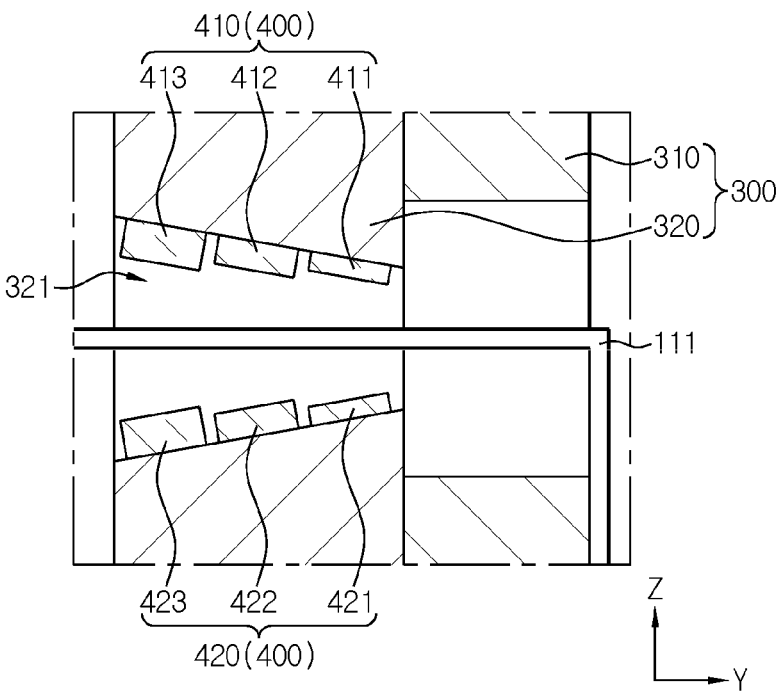
FIG. 11 is a cross-sectional view schematically showing the configuration of a blocking member according to still another embodiment of the present disclosure.

FIG. 11 is a cross-sectional view schematically showing a blocking member 400 according to still another embodiment of the present disclosure. In particular, FIG. 11 may be regarded as a configuration before transformation of the blocking member 400. For this embodiment, features different from the former embodiments will also be described in detail.

Referring to FIG. 11, as in the former embodiment of FIG. 9, the blocking member 400 includes a plurality of unit blocking members arranged from the inside to the outside, but at least two unit blocking members among them have different thicknesses. For example, the three unit blocking members provided in the upper blocking member 410, namely the outer blocking member 411, the central blocking member 412, and the inner blocking member 413, may be configured to have different thicknesses.

In particular, in this configuration, the three unit blocking members may be configured to have a greater thickness from the outside to the inside. For example, in the configuration of FIG. 11, the thickness of the outer blocking member 411 may be smallest, the thickness of the inner blocking member 413 may be greatest, and the thickness of the central blocking member 412 may be middle. In addition, the three unit blocking members 421, 422, 423 included in the lower blocking member 420 may also be configured in this way.

According to this configuration of the present disclosure, with respect to the inner space of the slot 321 in which the inclined portion is formed, the sealing force may be further improved. In particular, according to this embodiment, even if the thermal expansion coefficients of the unit blocking members are the same, there may be a difference in the final expansion thickness of each unit blocking member due to the difference in thickness. Therefore, in this case, if heat is applied to each unit blocking member, the expansion form as shown in FIG. 10 may be implemented.

The blocking member 400 may be configured to press the electrode lead 111 when heat is applied thereto to transform the shape.

For example, referring to FIG. 7, when the upper blocking member 410 is expanded, the upper blocking member 410 may be configured not only to contact the upper surface of the electrode lead 111 at the portion indicated by A3 but also to press the upper surface of the electrode lead 111 in the lower direction. In addition, when expanded, the lower blocking member 420 may be configured not only to contact the lower surface of the electrode lead 111 at the portion indicated by A3 but also to press the lower surface of the electrode lead 111 in the upper direction.

According to this configuration of the present disclosure, the sealing force between the blocking member 400 and the electrode lead 111 may be further improved. Moreover, when the venting gas is discharged to the outside of the battery module, a negative pressure may be formed inside the battery module, so that the external gas containing oxygen may try to flow into the slot 321 with a considerable force. However, according to this embodiment, since the blocking member 400 and the electrode lead 111 may be sealed with a strong force, it is possible to more reliably block the inflow of oxygen.

Figure 12:
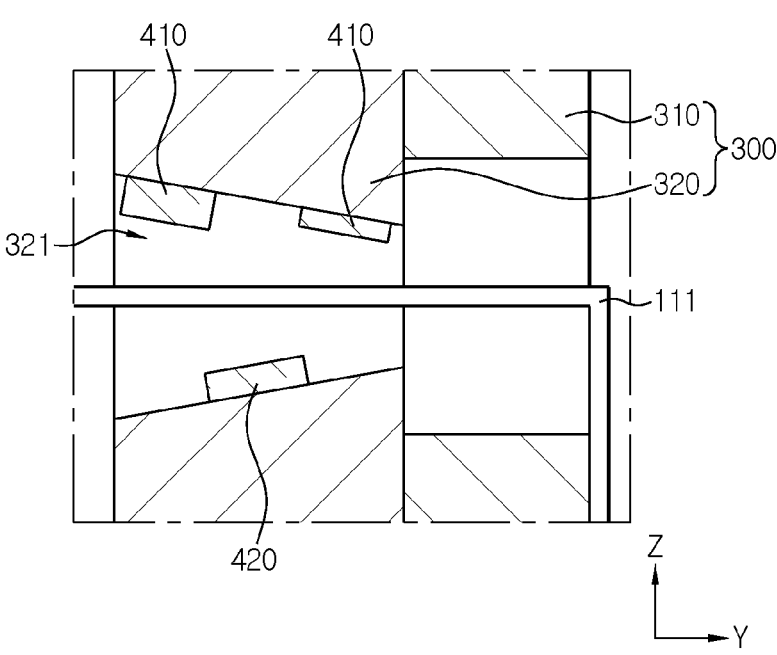
FIGS. 12 and 13 are cross-sectional views schematically showing the configuration of a blocking member according to still another embodiment of the present disclosure.
Figure 13:
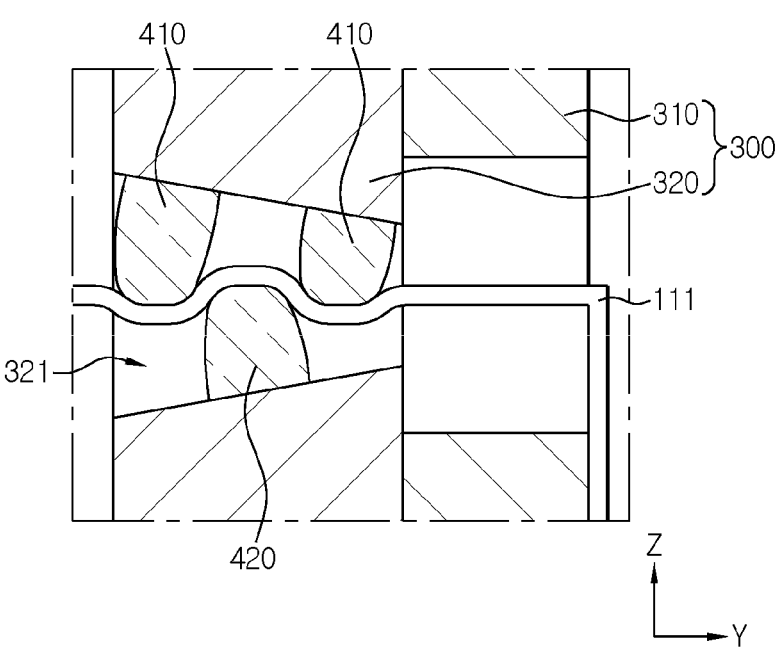

FIGS. 12 and 13 are cross-sectional views schematically showing a blocking member 400 according to still another embodiment of the present disclosure. In particular, FIG. 12 shows a configuration before transformation of the blocking member 400, and FIG. 13 shows a configuration after transformation of the blocking member 400. For this embodiment, features different from the former embodiments will also be described in detail.

First, referring to FIG. 12, the blocking member 400 includes an upper blocking member 410 and a lower blocking member 420, and the upper blocking member 410 and the lower blocking member 420 may be alternately arranged from the inside to the outside. For example, in the left and right direction (Y-axis direction) in the drawing, the center of the two upper blocking members 410 may be formed at a different position from the center of one lower blocking member 420.

According to this configuration of the present disclosure, the oxygen inflow blocking effect by the blocking member 400 may be further improved. In particular, when the upper blocking member 410 and the lower blocking member 420 in this configuration are configured to press the electrode lead 111 during expansion, the electrode lead 111 may be bent, as shown in FIG. 13. That is, the upper blocking member 410 may press the electrode lead 111 in the lower direction, and the lower blocking member 420 may press the electrode lead 111 in the upper direction. In addition, since the pressing directions are alternated, the electrode lead 111 may have a shape bent up and down, as shown in FIG. 13. In this case, the adhesion between the blocking member 400 and the electrode lead 111 may be further increased. In addition, since the space between the electrode lead 111 and the blocking member 400 is not formed in a straight line but is formed in a curve, a path for the inflow of oxygen may become long and complicated. Therefore, according to this embodiment, the effect of blocking oxygen that may flow in along the surface of the electrode lead 111 may be further improved.

A battery pack according to the present disclosure may include a plurality of battery modules according to the present disclosure described above. In addition, the battery pack according to the present disclosure may further include various other components other than the battery module, for example components of the battery pack known at the time of filing of this application, such as a BMS, a bus bar, a pack case, a relay, a current sensor, and the like.

An energy storage system according to the present disclosure may include at least one battery module according to the present disclosure. In particular, the energy storage system may include a plurality of battery modules according to the present disclosure in the form of being electrically connected to each other in order to have a large energy capacity. Alternatively, a plurality of battery modules according to the present disclosure may configure one batter pack, and the energy storage system may be configured to include a plurality of battery packs. In addition, the energy storage system according to the present disclosure may further include other various components of the energy storage system known at the time of filing of this application. Moreover, the energy storage system may be used in various places or devices, such as a smart grid system or an electric charging station.

Meanwhile, in this specification, terms indicating directions such as "upper", "lower", "left", "right", "front", and "rear" are used, but these terms are just for convenience of explanation, and it is obvious to those skilled in the art that these terms may vary depending on the location of an object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
| --- | --- |
| 100: | cell assembly |
| 110: | secondary battery |
| 111: | electrode lead |
| 200: | module case |
| 210: | upper case, |
| 220: | lower case |
| 300: | bus bar assembly |
| 310: | module bus bar, |
| 320: | bus bar housing |
| 321: | slot |
| 400: | blocking member |
| 410: | upper blocking member, |
| 420: | lower blocking member |
| 411, 421: | outer blocking member |
| 412, 422: | central blocking member |
| 413, 423: | inner blocking member |

What is claimed is:

1. A battery module, comprising:
a cell assembly configured such that secondary batteries having electrode leads are stacked in a first direction;
a module case configured to accommodate the cell assembly in an inner space thereof;
a bus bar assembly located on at least one side of the module case and including a module bus bar made of an electrically conductive material and electrically connected to the electrode leads of the cell assembly and a bus bar housing configured so that the module bus bar is placed thereon and having a slot through which an electrode lead of the electrode leads passes; and
at least one blocking member attached to an inner surface of the slot of the bus bar housing when in an unexpanded state and configured to close at least a portion of the slot by transforming a shape thereof when heat is applied thereto.

2. The battery module according to claim 1, wherein the at least one blocking member is configured to expand in volume to close an empty space of the slot when heat is applied thereto.

3. The battery module according to claim 1, wherein the at least one blocking member is attached to an upper wall and a lower wall of the slot to be on opposite sides of the electrode lead.

4. The battery module according to claim 1, wherein the at least one blocking member is a sheet.

5. The battery module according to claim 1, wherein the bus bar housing is configured to have an inclined portion formed at the slot, and
wherein the at least one blocking member is attached to the inclined portion.

6. The battery module according to claim 1, wherein the at least one blocking member is a plurality of blocking members so that the plurality of blocking members are arranged from an inner side to an outer side of the bus bar housing.

7. The battery module according to claim 6, wherein at least two blocking members of the plurality of blocking members are arranged from the inner side to the outer side of the bus bar housing and have different thermal expansion coefficients.

8. The battery module according to claim 1, wherein the at least one blocking member is configured to press the electrode lead when the shape of the at least one blocking member is transformed.

9. A battery pack, comprising a plurality of battery modules according to claim 1.

10. An energy storage system, comprising the battery module according to claim 1.

* * * * *